(12) United States Patent
Knapp et al.

(10) Patent No.: US 10,724,889 B2
(45) Date of Patent: Jul. 28, 2020

(54) LIQUID LEVEL DETECTION IN RECEPTACLES USING A PLENOPTIC CAMERA TO MEASURE THE SURFACE TOPOGRAPHY OF THE LIQUID

(71) Applicant: CSEM Centre Suisse d'Electronique et de Microtechnique SA—Recherche et Dèveloppment, Neuchâtel (CH)

(72) Inventors: Helmut Knapp, Ebikon (CH); Philipp Schmid, Lucerne (CH); Christian Beyer, Olten (CH); Matthias Höchemer, Sachseln (CH); Vincent Revol, Lucerne (CH)

(73) Assignee: CSEM Centre Suisse d'Electronique et de Microtechnique SA—Recherche et Dèveloppment, Neuchâtel (CH)

( * ) Notice: Subject to any disclaimer, the term of this patent is extended or adjusted under 35 U.S.C. 154(b) by 0 days.

(21) Appl. No.: 16/035,733

(22) Filed: Jul. 16, 2018

(65) Prior Publication Data

US 2019/0017857 A1 Jan. 17, 2019

(30) Foreign Application Priority Data

Jul. 14, 2017 (EP) .................................... 17181439

(51) Int. Cl.
*G01F 22/00* (2006.01)
*G01F 23/292* (2006.01)
(Continued)

(52) U.S. Cl.
CPC .............. *G01F 22/00* (2013.01); *G01F 23/22* (2013.01); *G01F 23/292* (2013.01); *G06T 7/62* (2017.01);
(Continued)

(58) Field of Classification Search
CPC ...... B01L 3/5082; B01L 3/5085; G01F 22/00; G01F 23/22; G01F 23/292;
(Continued)

(56) References Cited

U.S. PATENT DOCUMENTS

| 4,824,230 | A | 4/1989 | Litt |
| 2005/0285060 | A1* | 12/2005 | Haga .................. G01F 23/0061 250/577 |

(Continued)

FOREIGN PATENT DOCUMENTS

| CN | 102 279 032 | 12/2011 |
| WO | WO 2016/025278 | 2/2016 |

OTHER PUBLICATIONS

European Search Report, EP17181439, dated Jan. 16, 2018.
(Continued)

*Primary Examiner* — Jessica M Prince
(74) *Attorney, Agent, or Firm* — Young & Thompson (57) ABSTRACT

Disclosed is a method of measuring a volume of a liquid provided in at least one receptacle, including the steps of: providing a receptacle having at least one cavity for holding a liquid; providing a plenoptic camera positioned so as to be able to image the surface of the liquid; positioning the receptacle such that the liquid surface faces an objective lens of the plenoptic camera; making at least one plenoptic image of the surface of the liquid by way of the plenoptic camera; determining a surface topography of the liquid on the basis of the at least one image; calculating the volume of liquid based on the measured surface topography and at least one known dimension and/or position of the cavity.

5 Claims, 6 Drawing Sheets

(51) Int. Cl.
*G06T 7/62* (2017.01)
*H04N 13/296* (2018.01)
*H04N 5/232* (2006.01)
*G01F 23/22* (2006.01)
*B01L 3/00* (2006.01)

(52) U.S. Cl.
CPC ....... *H04N 5/23299* (2018.08); *H04N 13/296* (2018.05); *B01L 3/5082* (2013.01); *B01L 3/5085* (2013.01); *G06T 2207/10052* (2013.01)

(58) Field of Classification Search
CPC ............ G06T 2207/10052; G06T 7/62; H04N 13/296; H04N 5/23299
See application file for complete search history.

(56) References Cited

U.S. PATENT DOCUMENTS

2014/0177932 A1* 6/2014 Milne ................ G01N 15/1475
382/128

2016/0341591 A1* 11/2016 Cipullo ................. G01F 23/292
2017/0082486 A1* 3/2017 Send ........................ G01S 11/12
2019/0107430 A1* 4/2019 Luedemann ........... G01B 11/00

OTHER PUBLICATIONS

Adelson et al., "The Plenoptic Function and the Elements of Early Vision", Computational Models of Visual Processing (pp. 3-20) Cambridge, MA: MIT Press (1991).

Heinze et al., "Automated Robust Metric Calibration Algorithm for Multifocus Plenoptic Cameras", IEEE Transaction on Instrumentation and Measurement, vol. 65, No. 5, May 2016.

Ihrke et al., "Principles of Light Field Imaging: Briefly Revisiting 25 Years of Research", IEEE Signal Processing Magazine, Institute of Electrical and Electronics Engineers, 2016, 33 (5), pp. 59-69.

Thurow et al., "A Fast Optical Method for the Determination of Liquid Levels in Microplates", Journal of Automated Methods and Management in Chemistry, vol. 2011, Article ID 805153, 6 pages, doi:10.1155/2011/805153.

* cited by examiner

LIQUID LEVEL DETECTION IN RECEPTACLES USING A PLENOPTIC CAMERA TO MEASURE THE SURFACE TOPOGRAPHY OF THE LIQUID

TECHNICAL FIELD

The present invention relates to the technical field of contactless measurement of the fill level of liquids in receptacles such as multi-well plates used in life sciences.

STATE OF THE ART

Multi-well plates are arrays of receptacles incorporated into a single container in an array, and are used typically for assays (e.g. bioassays, immunoassays and so on) as well as for culturing cells, tissue samples and so on. Such plates allow researchers to carry out large numbers of tests in parallel in a single multi-well plate (with typically between 6 and over 1536 on a single plate), which helps to efficiently perform large numbers of tests in substantially identical conditions since the atmospheric conditions (temperature, pressure, heat) are guaranteed identical for each well of the plate.

In many types of such assays, it is important to know the fill level of the liquid in the wells, and hence its volume. This information can be used to guarantee an equal volume of each liquid in each well and serve as a verification for a pipetting operation, to top off the liquid level to prevent the well contents from drying out, or may provide useful information in relation to the progress of a reaction or as to evaporation rates, and so on.

The same concerns also apply to (semi-)automated assays carried out in individual test tubes or other liquid receptacles, as well as to calibration plates used for calibrating pipetting systems.

Several of the many prior art techniques which have been developed for detecting the fill level of such receptacles are described below.

Ultrasonic measurements of the position of the liquid surface in a well of a multi-well plate can be carried out by echo-detection of the position of the surface of the liquid with respect to a sensor. By knowing the dimensions of the test apparatus such as the dimensions of the multi-well plate and its position with respect to the sensor. Such measurements are contactless, easy to integrate into a process, are relatively inexpensive, and are relatively accurate. In respect of this latter point, an accuracy of around 1 µL is possible. However, such sensors are only capable of one-dimensional point measurements of limited resolution in the plane of the liquid surface, which implies an error due to the liquid meniscus. In particularly small wells holding e.g. 0-10 µL of liquid, the meniscus can have a significant volume with respect to the total volume contained in the well. Furthermore, the functioning of such sensors is however independent of the transparency or colour of the liquid, which is advantageous in certain cases.

Furthermore, the publication "*A Fast Optical Method for the Determination of Liquid Levels in Microplates*", Thurow et al., Journal of Automated Methods and Management in Chemistry (2011), Article ID 805153 describes a qualitative optical fill level detection method which has potential for quantitative volume estimation from two-dimensional droplet projections during pipetting. This method utilizes a conventional digital camera, which is primitive and unlikely ever to be able to measure volumes already present in wells.

An object of the invention is hence to overcome the above-mentioned drawbacks of the prior art, and thereby to propose an improved and more accurate non-contact method and apparatus for measuring the volume of liquid in receptacles such as wells of multi-well plates.

DISCLOSURE OF THE INVENTION

More specifically, the invention relates to a method of measuring a volume of a liquid provided in at least one receptacle such as a well of a multi-well plate, a petri dish, a test tube or similar. The method of the invention comprises the steps of:

providing a receptacle having at least one cavity for holding a liquid;

providing a plenoptic camera positioned so as to be able to image the surface of said liquid, e.g. with its optical axis perpendicular to the plane of the receptacle or at an angle thereto. Such cameras, also referred to as light field cameras, record not only the colour and intensity of light reaching them, but also the direction each light ray is travelling, and as a result 3D data can be gleaned from the plenoptic images generated by them;

positioning the receptacle such that the liquid surface faces an objective lens of the plenoptic camera;

making at least one plenoptic image (also referred to in the literature as a "light field image") of the surface of the liquid by means of the plenoptic camera;

determining a surface topography of said liquid on the basis of said at least one image by processing the plenoptic image; and calculating the volume of liquid based on the measured surface topography and at least one known dimension and/or position of at least part of said cavity, such as the position and shape of the bottom of the cavity.

Processing a plenoptic image to extract data and thereby determine a surface topography of the liquid in the receptacle which can then e.g. be integrated down to the known position and shape of the bottom of the receptacle enables extremely precise contactless volumetric measurements to be carried out, which take into account and include the meniscus of the liquid. Conventional methods do not have a sufficiently high resolution to take into account the meniscus, which can represent a significant proportion of the volume in the case of very small liquid samples. This results in accuracy limitations which are overcome by the present method. The method can be carried out in a control unit, which may be a general-purpose computer or a dedicated unit.

Advantageously, the receptacle is at least partially transparent, and a pattern is provided so as to be imaged through the liquid by the plenoptic camera, the surface topography of the liquid being measured at least partially based on distortion of said pattern caused primarily by the curvature of the meniscus of the liquid. Use of this distortion improves the visibility and measurability of the surface of the liquid by the plenoptic camera, which improves the accuracy of surface topography produced during the carrying out of the method.

Advantageously, the surface of the liquid is illuminated with a light exhibiting a predetermined pattern while the plenoptic image is taken. Again, distortion of this incident light pattern makes it easier for the surface topography to be measured since it makes the surface, particularly the meniscus, more visible to the camera.

Advantageously, said liquid is vibrated while the plenoptic image is taken. This vibration of the surface, which may involve generating standing waves or continually changing wave patterns, renders the surface of the liquid more visible to the camera due to scattering of the light at the surface waves, and is particularly applicable in combination with the structured, patterned light as mentioned above.

Advantageously, said at least one known dimension or position of said cavity is the shape of the bottom of said receptacle and/or its position with respect to said plenoptic camera. The topographic profile can simply be integrated down to the known position and shape of the bottom of the receptacle to determine the liquid volume. It is not necessary to know the other dimensions of the receptacle, since these will be apparent from the plenoptic image and the topographic profile determined therefrom.

Advantageously, said at least one known dimension or position of said cavity has previously been obtained by taking a plenoptic image of said cavity. This can e.g. be performed by using the apparatus of the invention to take a plenoptic image of an empty cavity or cavities and to generate a 3D model thereof. This model can then be compared with the 3D model of the surface of the liquid obtained by the method of the invention, so as to calculate the volume of liquid contained in each cavity with great precision. Alternatively, such a 3D model may be created of the cavity or cavities of a representative, standard receptacle of the type being used.

It should be noted that the above-mentioned method features can be combined in any manner which makes technical sense.

The invention further relates to an apparatus for measuring a volume of liquid provided in at least one receptacle such as a well of a well plate, a test tube, a petri dish or similar. This apparatus comprises a support for receiving a receptacle which has at least one cavity for holding a liquid, a plenoptic camera facing said support, as well as a control unit communicating with at least said camera and adapted to carry out any of the variants of methods as outlined above. By "adapted", it is meant that the control unit is not merely capable of carrying out the method, but that it is indeed programmed or otherwise set up to do so. As already discussed above, such cameras, also referred to as light field cameras, record not only the colour and intensity of light reaching them, but also the direction each light ray is travelling, and as a result 3D data can be gleaned from the plenoptic images generated by them, and as a result the surface topography of the liquid can be determined and processed so as to measure the volume of the liquid precisely, including that represented by the meniscus.

Advantageously, the plenoptic camera is mounted on a scanning stage movable perpendicular to the optical axis of said plenoptic camera. As a result, the camera can be moved so as to image multiple wells of a multi-well plate without moving the plate itself, thus without risking disturbing the surface of the liquid.

Advantageously, a pattern is provided so as to be viewable through said receptacle by said plenoptic camera. This pattern can comprise at least one of: a grid pattern, a random noise pattern, a raster pattern, a checkerboard pattern or any combination thereof. Distortion of this pattern by the meniscus as measured by the plenoptic camera when the plenoptic image is taken can then be exploited to precisely measure the surface topography of the liquid.

Advantageously, the apparatus further comprises at least one illumination device, resulting in consistent lighting conditions and thus consistent measurements. This illumination device can be adapted to produce a structured incident light pattern with e.g. the same patterns as mentioned above.

Advantageously, the apparatus further comprises a vibrator arranged to vibrate the surface of said liquid. Such a vibration while the plenoptic image is taken renders the surface of the liquid more visible to the camera, particularly when structured incident light is used as mentioned above. This vibrator is advantageously integrated into said support, which ensures excellent transmission of vibration to the receptacle and hence to the liquid, but it may also be arranged to transmit vibrations through the air to the liquid. Particularly appropriate vibrations are ultrasonic vibrations, in which case the vibrator is an ultrasonic transducer. These vibrations can be waves in at least one of the X, Y and Z directions, or any combination thereof.

It should be noted that the above-mentioned apparatus features can be combined in any manner which makes technical sense.

Finally, the invention relates to a computer program product directly loadable into the internal memory of a digital computer, said product comprising software code portions for causing an apparatus according to any variant of the invention to perform the steps of the method of any variant the invention when said product is run on a computer acting as said control unit.

BRIEF DESCRIPTION OF THE DRAWINGS

Further details of the invention will appear more clearly upon reading the description below, in connection with the following figures which illustrate.

EMBODIMENTS OF THE INVENTION

The present invention exploits the properties of plenoptic cameras, also known as light-field cameras, in order to measure the volume of liquid in a well (i.e. a cavity) of a multi-well plate. Conventional digital cameras measure only the intensity and colour of light arriving on each pixel of a sensor, and hence create two-dimensional images. Plenoptic cameras, by contrast, capture information about the light field emanating from the subject being imaged. In doing so, information is measured regarding the direction of travel of each light ray captured by the camera. Such cameras typically comprise an array of microlenses placed one focal length away from the image plane of a sensor, and are commercially available from the manufacturers Raytrix and Lytro, amongst others.

By processing the data relating to the intensity, colour and direction of travel of the lights rays detected by such plenoptic cameras, 3D models of the subject being imaged can be generated. Generation of such models is well-described in the academic literature, and thus need not be described in detail here. Examples of publications dealing with this subject are:

Ihrke et al, *Principles of Light Field Imaging: Briefly revisiting 25 years of research*, IEEE Signal Processing Magazine (Volume: 33, Issue: 5, September 2016);

Heinze et al, *Automated Robust Metric Calibration Algorithm for Multifocus Plenoptic Cameras*, IEEE Transactions on instrumentation and Measurement (Volume: 65, Issue: 5, May 2016), and Edward H. Adelson, James R. Bergen: *The plenoptic function and the elements of early vision*. In: M. Landy, J. A. Movshon (Hrsg.): Computation Models of Visual Processing. MIT Press, Cambridge 1991, ISBN 0-262-12155-7.

By generating a model of the surface of the liquid including its meniscus by means of such models, together with a priori knowledge of the dimensions and/or position of the multi-well plate (in particular the position of the bottom of the well 7 with respect to the camera 11), the volume of liquid therein can be precisely calculated at the sub-microlitre level, down to approximately 0.5 µL or even down to 0.25 µL depending on the dimensions of the well 7 and the depth-perception accuracy of the camera 11 used.

Figure 1:
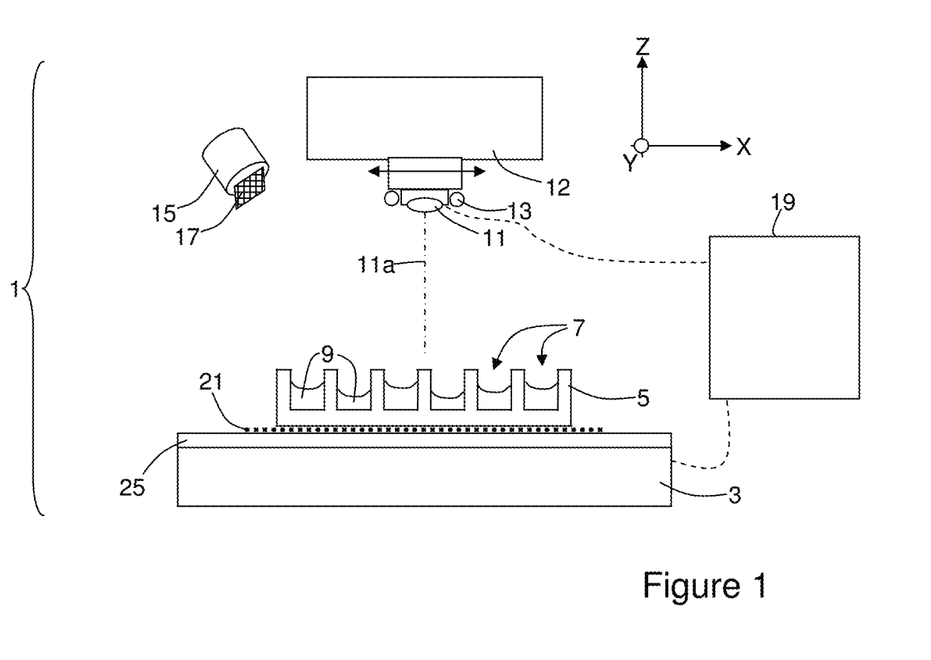
FIG. 1: a schematic view of an apparatus according to the invention.

The foregoing principle is illustrated schematically in the apparatus of FIG. 1.

This apparatus 1 comprises a support 3 arranged to support a multi-well plate 5 of any convenient type. The same principle can equally be applied to individual test tubes, petri dishes or other suitable receptacles. Certain embodiments of the invention are best applied with transparent well plates, whereas others function with both transparent and opaque plates, as will become clearer below. Furthermore, certain optional aspects of the support 3 will be described below in connection with the specific embodiments to which they relate. Support 3 can be fixed or mobile, and may be associated with a robotic handling system for manipulating well plates 5, test tubes, petri dishes or any other appropriate receptacles.

Multi-well plate 5 comprises, as is generally known, an array of individual receptacles 7, referred to here as "wells", which are cavities adapted to contain a quantity of liquid 9. This liquid is typically introduced into the wells by means of a manual or automated pipetting operation, which is typically calibrated to introduce a predetermined volume of liquid. In order to ensure that this quantity of liquid is identical from well to well, so as to provide identical conditions for the progress of a chemical, biochemical or biological reaction, or for the growth of a cell or tissue culture, this volume can be verified by the apparatus 1 of the invention after the pipetting operation is carried out.

The apparatus 1 further comprises a plenoptic camera 11 mounted facing the support 3. Camera 11 may be mounted to a scanning stage 12 movable in the X and or Y directions (parallel to the plane of the support 3), and also in the Z direction (up and down), or may be stationary and the support 3 and/or the multi-well plate 5 can be moved in at least the X and/or Y directions. Furthermore, multiple cameras 11 may be provided in a line or in a two-dimensional array if desired, and camera 11 may be linked to the support 3 by means of a frame (not illustrated). Camera 11 and optionally also support 3 are operationally connected to a controller 19 (as illustrated schematically with a dashed line), which may be a general purpose programmable computer or may be a dedicated, purpose-built control unit.

In the illustrated embodiment, camera 11 comprises an objective lens (illustrated schematically with an oval) directly facing the support, with its optical axis 11a aligned along the Z direction. However, it is not excluded that the optical axis 11a of the camera 11 could be inclined with respect to the Z direction. It should be noted furthermore that the camera 11 can image multiple wells 7 simultaneously, and thus volume measurements of liquid in multiple wells 7 can be performed in parallel if desired.

As already mentioned above, the data captured by the plenoptic camera can be used to build a 3D topographic model of the subject being imaged, by extracting depth map information from the data. The details of how to use the data to build such 3D models are outside the scope of the invention, and any known method can be used. Since this 3D model may include the edges of the well 7, the diameter of the well 7 does not have to be known a priori since it is directly measured when measuring the surface of the liquid 9; however the position and shape of the bottom of the well 7 with respect to the camera 11 should be known directly or indirectly in order to convert this topographic model into a volume measurement. It is, however, also possible to assume the shape of the bottom of the well 7, at which point the volume of liquid 9 can be measured based on the measured surface topography and direct or indirect knowledge of the position of the bottom of the well 7.

One particularly advantageous way to obtain the shape of the well 7 is to plenoptically image it in an empty state by means of the apparatus 1, thereby generating a 3D model of the receptacle 7 itself. This model can be stored and compared with the 3D model of the surface of the liquid 9 to give an extremely accurate volume measurement. This technique can be applied either to representative (i.e. standard) receptacles 7 of the type being used, or to each individual receptacle 7 which may be provided with a barcode, QR code, RFID tag or similar identifying means such that it can later be identified when making volume measurements, and the correct 3D model of the receptacle 7 can thus be compared with the measurements taken of the surface of the liquid 9. Measuring each receptacle plenoptically can limit errors caused by the typical manufacturing tolerances of the receptacles 7 used, and can allow receptacles 7 of unknown dimensions to be used with the method of the invention.

FIG. 1 also illustrates several illumination devices 13, 15. These illumination devices can comprise conventional light-bulbs, LED's, compact fluorescent tubes, or any other convenient light-emitting devices. Illumination device 13 is a ring lamp coaxial with the optical axis 11a of the camera 11, and may be a single element or multiple discrete elements. Illumination device 15 is offset and illuminates the multi-well plate 5 at an angle through a mask 17 which will be described in more detail below.

In the simplest embodiment of the invention which applies primarily to at least partially opaque liquids 9, the camera 11 simply observes at least one well 7 of the well plate 5 at a time under illumination, and thereby captures the light field emanating from the surface. The depth information is then extracted, and a topographic profile of the surface, including the meniscus, is created. By knowing the dimensions of the well 7 and the distance of the camera 11 from the support 3, the volume of liquid 9 in the well 7 can be calculated by the controller 19. This method is further described below in generic terms in connection with the flow chart of FIG. 7.

If the camera 11 can observe multiple wells 7 simultaneously, then the surface topography of all the wells 7 in question can be determined at the same time. This topography includes the meniscus which may be irregular, and thus integrating the topography gives an accurate determination of the liquid volume down to an accuracy of 0.5 µL or even 0.25 µL or better.

This basic embodiment, in which the surface of the liquid 9 can be adequately visualised already, functions with both opaque and transparent well plates 5.

However, the liquid 9 in the wells 7 is typically substantially transparent, and may be coloured or colourless. As a result, the surface of the liquid 9 can be difficult to measure by means of the camera 11, since light rays emanating from the bottom of a well 7 pass straight through the majority of the surface without being refracted or otherwise modified in a manner sufficient to be detected by the camera 11. It is thus difficult or impossible to extract the correct depth information from these rays so as to generate the surface topography.

The present invention proposes several solutions to this problem, the first of which involves providing a pattern 21 viewed through the liquid 9. In the illustrated embodiment, this pattern 21 is provided between a transparent multi-well plate 5 and the support 3, and can be provided on its own substrate or directly upon the upper surface of the support 3. Alternatively, the pattern 21 can be integrated into the underside of the well plate 5, or at the bottom of each well 7. This latter option is particularly relevant in the case of opaque well plates.

The pattern 21 can be of any convenient type such as a raster pattern, a grid pattern of lines, dots or other shapes, a checker board pattern, a random noise pattern, or similar. It may be black and white, greyscale, or coloured. In the example illustrated in FIG. 2, the pattern is a monochrome substantially homogeneous random noise pattern generated without any tendency to exhibit features in any particular direction, as might be present in the case of a random noise pattern generated in raster fashion.

Figure 2:
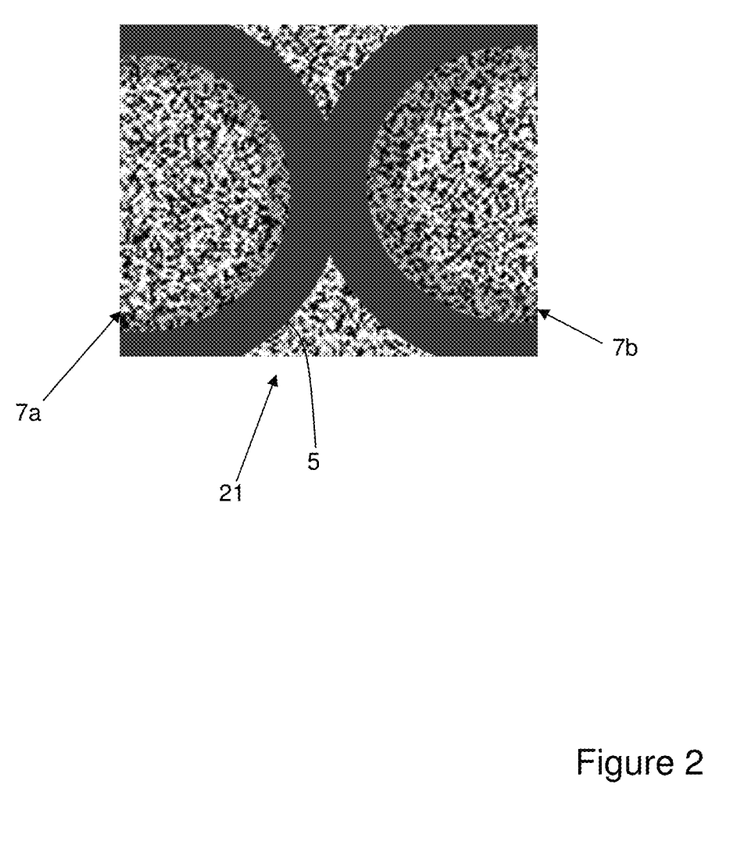
FIG. 2: a schematic image of parts of two adjacent wells in a multi-well plate as imaged by a plenoptic camera.

Looking now more closely at FIG. 2, which is a schematic 2D representation of a plenoptic image as would be obtained by the camera 11, the edges of the wells 7 can be clearly determined (and are simply represented in solid grey), but the pattern 21 is substantially undistorted near the middles of each well 7, since the light rays emanating therefrom simply pass straight through the optical interfaces with the well plate 5, the liquid 9, and the air above the liquid 9, without being deviated. However, as can clearly be seen towards the edges of the wells 7a, 7b, the curvature of the meniscus causes distortion of the pattern 21, as represented schematically by the transparent grey zones. In reality the distortion does not make the meniscus darker than the remainder of the surface, it is only illustrated this way here for clarity and reproducibility.

Figure 3:
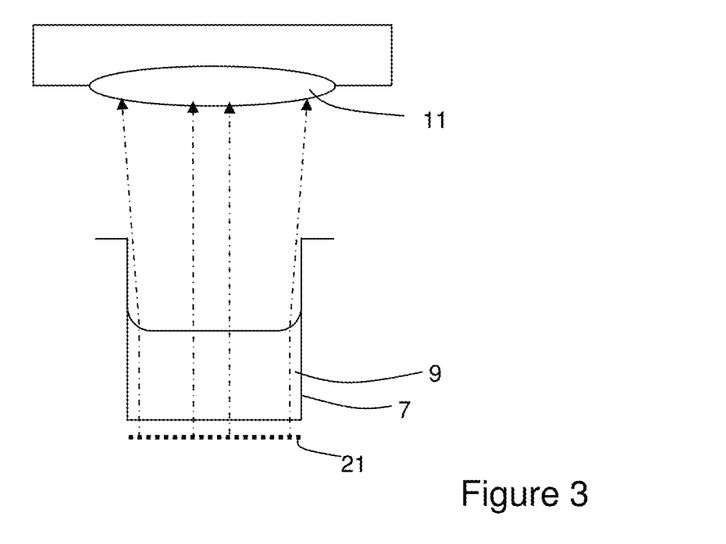
FIG. 3: a schematic view of the principle of pattern distortion exploited in one embodiment of the invention.

This distortion is illustrated in schematically in exaggerated form in FIG. 3. The light rays passing orthogonal to the planar portion of the surface of the liquid 9 (the inner two arrows) are unrefracted, whereas those passing through the meniscus (the outer two arrows) are refracted outwards due to the transition from an optically-denser medium (liquid) to an optically-rarer medium (air) through the concave meniscus (considered from the air side).

This change in pathway depends on the refractive index of the liquid 9, as well as the form of the meniscus (which depends on the surface tension of the liquid 9 and its adhesion to the material of the walls of the well 7). Furthermore, the position of the meniscus with respect to the plenoptic camera 11 also affects the position of the corresponding light rays as they reach the camera.

By processing the information about the position and direction of arrival of the light rays coming from the portions of the pattern 21 distorted by the meniscus, e.g. by comparing these light rays with those which have passed through the liquid 9 unrefracted, a topographic representation of the meniscus can be generated, and a topographic model of the entire surface of the liquid 9 can be generated.

Figure 4:
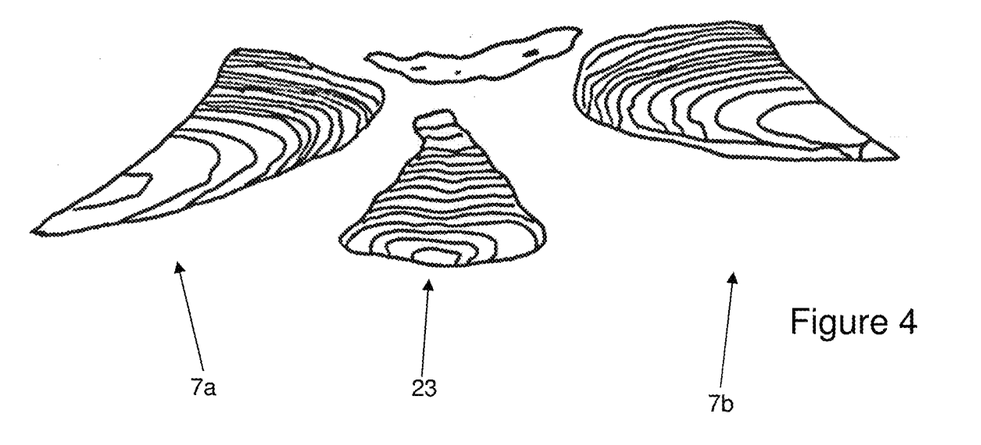
FIG. 4: a schematic perspective view of a 3D surface topography obtained by the apparatus and method of the invention.

An example of such a surface topography generated from the image of FIG. 2 is illustrated schematically in FIG. 4. This model is represented here a contour map viewed obliquely so as to better show the topography of the surface of the liquid 9 in the two wells 7a, 7b. The leftmost well 7a hence contains less liquid 9 than the rightmost well 7b (as was represented by the extent of the distorted grey zone on FIG. 2). The topography 23 modelled between the wells 7a, 7b relates to the light refracted by the material of the multi-well plate 5 and can be ignored.

By integrating under this topography down to the known position and shape of the bottom of the wells 7 (i.e. by calculating the volume between the measured surface and the known bottom of the well 7), the volume of liquid 9 can be calculated with extreme accuracy.

As an alternative embodiment, rather than use a pattern 21 situated under the liquid 9, the light used to illuminate the well plate 5 can be structured, and the distortion of the pattern caused by the meniscus can be used in a similar manner to in the previous embodiment to measure the topography of the surface of the liquid 9.

To this end, a suitable mask defining a suitable pattern may be provided in front of illumination device 15 and/or 13, and the camera 11 may be positioned with respect to the well plate 5 so as to image the structured light reflected from the surface of the liquid 9 in the wells 7.

Figure 5:
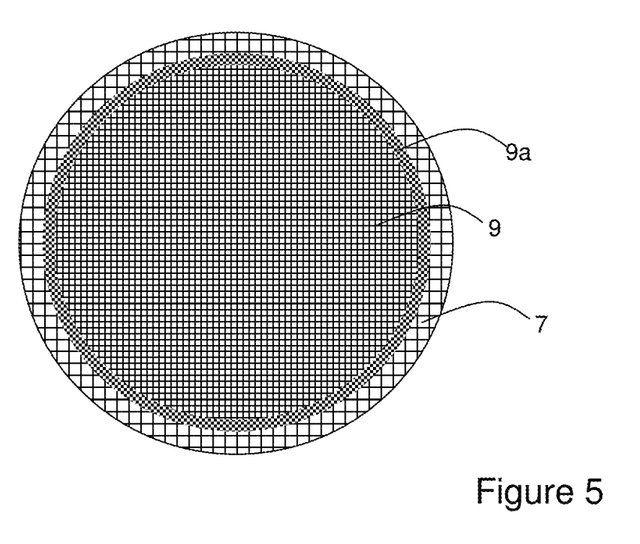
FIG. 5: a schematic plan view of a well of a multi-well plate illustrating pattern distortion using structured light illumination.

A schematic view of this approach, as viewed by the plenoptic camera 11, is illustrated in FIG. 5. This figure shows the undistorted pattern reflected from the substantially planar surface of the liquid 9, as well as the distortion thereof caused by the meniscus 9a. The top face of the well 7 is closer to the camera 11 and to the structured light source 13, 15, so reflects the pattern substantially undistorted, but at larger scale.

This approach may also be applied using dark-field illumination techniques as known from dark field microscopy, in combination with the plenoptic camera 11. Such techniques are used to increase the contrast of an image, and rely on arranging the camera 11 so as to collect only light scattered from the object to be imaged, in this case the surface of the liquid 9 and inevitably the multi-well plate 5. The details of such illumination techniques are well-known and need not be detailed here.

Since this embodiment relies on reflection rather than transmission of light, it does not require the use of transparent well plates 5 and is hence compatible with opaque well plates 5.

Figure 6:
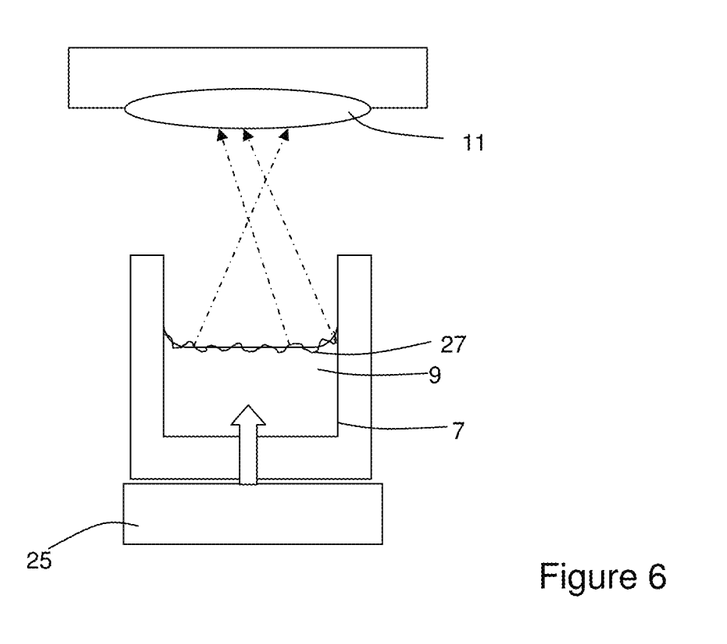
FIG. 6: a schematic view illustrating the principle of vibrating the liquid in a well.

Another approach for rendering the surface of the liquid 9 visible to the plenoptic camera 11 is to excite the liquid 9 with vibrations, such as ultrasonic waves produced by an ultrasonic transducer. To this end, the support 3 max comprise an ultrasonic transducer 25 (or other appropriate vibrator) integrated therein so as to be able to excite the multiwell plate 5. Alternatively, such a transducer can be arranged through a coupling agent (such as water) to the surface of the well plate or in free space so as to direct sound waves onto the surface of the liquid 9 in the wells 7.

This variant is illustrated schematically in FIG. 6, which shows vibrator 25 integrated into the support 3 providing vibrational energy (represented by the large arrow) to the liquid 9, which causes the surface to vibrate as indicated by the wavy line 27 superimposed on the line representing the undisturbed surface of the liquid 9.

This vibration can be arranged so as to cause standing waves to be set up in the surface of the liquid 9, or alternatively to cause the surface to vibrate according to an ever-changing pattern. The exact choice of vibrational amplitude, direction and frequency depends on the nature of the liquid (viscosity, density, refractive index and so on) so as to best cause light to be refracted and/or scattered from the surface and thus provide useful information to the plenoptic camera 11. The vibrations can follow the X, Y or Z directions, or any combination thereof.

Alternatively, the vibrator 25 can be arranged facing the well plate 5 and transmit vibrations as sound energy through the air or through a coupling agent.

Light rays emanating from the light source 13, 15 are thus reflected at various angles by the vibrating surface of the liquid 9, and can thus be measured so as to be able to generate the above-mentioned topographic model of the surface of the liquid 9 and hence calculate its volume.

This embodiment is particularly advantageous when combined with the structured illumination mentioned above, either in a conventional or in a dark field mode, the vibration of the surface serving to render the structured light pattern more visible to the plenoptic camera.

Figure 7:
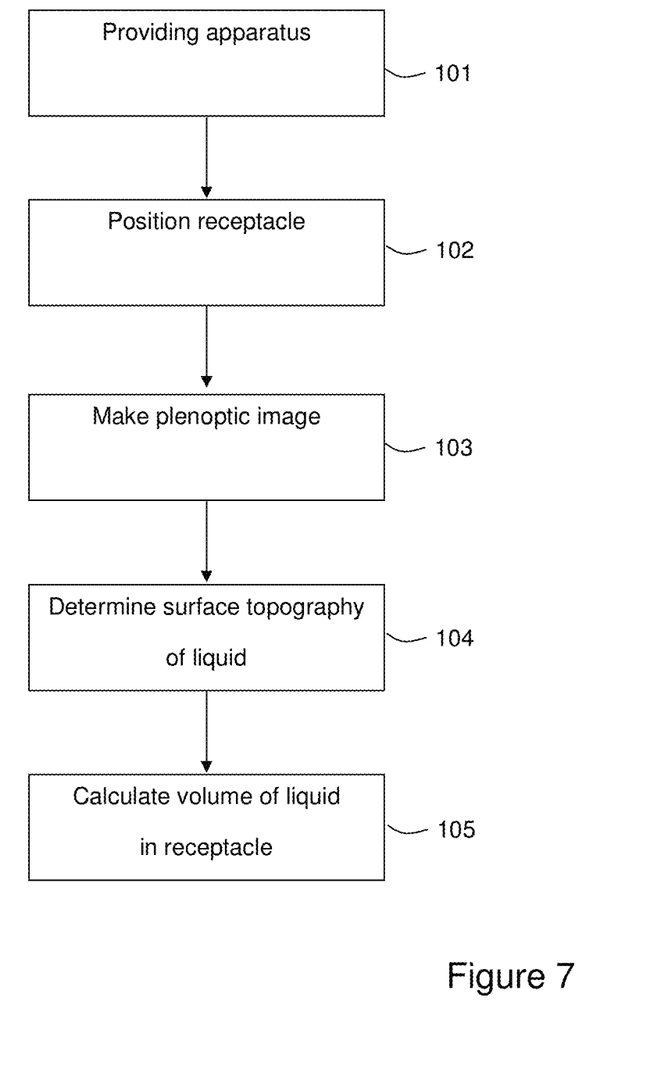
FIG. 7: a flow diagram of the simplest form of the method of the invention.

FIG. 7 illustrates schematically, and in its most generic form, the method of the invention as discussed above.

In this method, in step 101 the apparatus 1 as described above is provided. This apparatus comprises at least the plenoptic camera 11, the support 3 and the control unit 19. Other aspects (such as a pattern to be viewed through the liquid 9, structured lighting and so on) are also provided as required, depending on the exact details of the method.

In step 102, the receptacle 7, which may be a well 7 of a multi-well plate 5, a petri dish, a test tube or any other suitable receptacle, is positioned such that the plenoptic camera 11 can take a plenoptic image of the surface of the liquid contained therein.

In step 103, this plenoptic image is made under suitable lighting conditions (light field, dark field or other, with or without structured lighting) depending upon which of the above-mentioned embodiments is being used.

In step 104, the control unit 19 determines the surface topography of the liquid 9 based on the data relating to the plenoptic image.

In step 105, the control unit 19 calculates the volume of liquid 9 in the receptacle 7 e.g. by integrating under the profile of the surface topography determined in step 104 down to the known position and shape of the bottom of the receptacle. This latter may be known a priori, e.g. by previously measuring an empty receptacle 7 with the apparatus 1 so as to generate a 3D model thereof.

If the surface of the liquid 9 is to be vibrated, this occurs before or during step 103.

Furthermore, it goes without saying that any other aspects as described above can be incorporated at appropriate points in the method 101-105.

This method can be implemented by a computer program product directly loadable into the internal memory of a digital computer comprising software code portions for causing an apparatus 1 according to the invention to perform the steps 101-105 of the method when the product is run on a computer acting as said control unit 19.

Although the invention has been described with reference to specific embodiments, variations thereto are possible within the scope of the invention as defined in the appended claims.

The invention claimed is:

1. A method of measuring a volume of a liquid provided in at least one receptacle, comprising the steps of:
   providing an at least partially transparent receptacle having at least one cavity for holding a liquid;
   providing a plenoptic camera positioned so as to be able to image the surface of said liquid;
   positioning the receptacle such that the liquid surface faces an objective lens of the plenoptic camera;
   making at least one plenoptic image of the surface of the liquid by means of the plenoptic camera;
   determining a surface topography of said liquid on the basis of said at least one image;
   calculating the volume of liquid based on the measured surface topography and at least one known dimension and/or position of at least part of said cavity,
   wherein a pattern is provided so as to be imaged through the liquid by the plenoptic camera, the surface topography of the liquid being measured at least partially based on distortion of said pattern.

2. The method according to claim 1, wherein the surface of the liquid is illuminated with a light exhibiting a predetermined pattern while said plenoptic image is made.

3. The method according to claim 1, wherein said liquid is vibrated while said plenoptic image is made.

4. The method according to claim 1, wherein said at least one known dimension or position of said cavity is the shape of a bottom of said cavity and/or the position of the bottom of said cavity with respect to said plenoptic camera.

5. The method according to claim 1, wherein said at least one known dimension or position of said cavity has previously been obtained by taking a plenoptic image of said cavity, or by taking a plenoptic image of a standard cavity representative of the type of said cavity.

* * * * *